United States Patent
Kodama et al.

(10) Patent No.: US 6,337,153 B1
(45) Date of Patent: *Jan. 8, 2002

(54) SEALED NON-AQUEOUS ELECTROLYTE CELL HAVING A CASING OF A SHEET OF LAMINATED MATERIAL

(75) Inventors: Yasunobu Kodama, Sumoto; Shiori Maeda; Tsutomu Sonozaki, both of Hyogo; Takanori Fujii; Ikuro Nakane, both of Sumoto; Kazuo Teraji, Yawata; Satoshi Narukawa, Sumoto; Masataka Takeuchi, Chiba; Shuichi Naijo, Chiba; Takashi Ohkubo, Chiba, all of (JP)

(73) Assignees: Sanyo Electric Co., Ltd., Osaka; Showa Denko K.K., Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,229

(22) Filed: Jul. 22, 1998

(30) Foreign Application Priority Data

Jul. 23, 1997 (JP) ................................. 9-196685

(51) Int. Cl.[7] ................................................ H01M 2/02
(52) U.S. Cl. .......................... 429/163; 429/320; 429/178
(58) Field of Search .................................. 429/163, 188, 429/189, 300, 303, 304, 306, 320, 206, 162, 127, 175, 176, 178; 252/62.2

(56) References Cited

U.S. PATENT DOCUMENTS

| 4,007,122 | A | * | 2/1977 | Owens et al. ............ 252/62.2 |
| 4,092,464 | A | * | 5/1978 | Dey et al. |
| 4,997,732 | A | * | 3/1991 | Austin et al. .............. 429/163 |
| 5,168,019 | A |   | 12/1992 | Sugeno ...................... 429/194 |
| 5,472,808 | A | * | 12/1995 | Peled et al. |
| 5,648,011 | A | * | 7/1997 | Blonsky ..................... 252/62.2 |
| 6,001,505 | A | * | 12/1999 | Fukuda et al. |
| 6,004,693 | A | * | 12/1999 | Fukuda et al. |

FOREIGN PATENT DOCUMENTS

| JP | 56-130082 | | 10/1981 |
| JP | 59-9874 | | 1/1984 |
| JP | 59-81869 | | 5/1984 |
| JP | 60-65442 | | 4/1985 |
| JP | 63-318066 | | 12/1988 |
| JP | 1-112652 | | 5/1989 |
| JP | 5-303980 | | 11/1993 |
| JP | 8-83596 | | 3/1996 |
| JP | 11-7921 A | * | 1/1999 |
| JP | 11-86808 | * | 3/1999 |
| WO | WO 94/24715 | | 10/1994 |
| WO | WO 98/18173 | | 4/1998 |

* cited by examiner

Primary Examiner—Stephen Kalafut
Assistant Examiner—Susy Tsang
(74) Attorney, Agent, or Firm—Armstrong, Westerman, Hattori, McLeland & Naughton LLP

(57) ABSTRACT

A sealed non-aqueous electrolyte cell which has a casing made of a laminated material and which inhibits deterioration in the performance of the cell attributable to a decrease in the degree of sealing. This is achieved by addition of an inorganic oxide fine powder which is not an active material and is accommodated together with electric energy generating elements within the casing made from a laminated material composed of a metal foil and a resin film.

A polypropylene layer is disposed inside the casing and is bonded on the inner surface of the metal foil through a carboxylic acid-denatured polypropylene layer.

14 Claims, 6 Drawing Sheets

SEALED NON-AQUEOUS ELECTROLYTE CELL HAVING A CASING OF A SHEET OF LAMINATED MATERIAL

BACKGROUND OF THE INVENTION (1) Field of the Invention

The present invention relates to non-aqueous electrolyte cells and is particularly concerned with sealed non-aqueous electrolyte cells having electric energy generating elements sealed within a casing that is formed from a laminated material made from a metal foil and a resin film.

(2) Description of the Prior Art

Heretofore, metal sheets such as stainless steel sheets (SUS) have been used as casing materials for sealed cells. However, such a metal sheet has high rigidity and therefore cannot be easily formed into an extremely thin flat shape. In addition, the metal sheet has high specific gravity which causes a decrease in energy density per unit weight of the cell when used in the fabrication of extremely thin cells.

For these reasons, lately developed sheet-like (i.e., extremely thin flat plate type) sealed non-aqueous electrolyte cells use, as a casing material, a laminated material comprising a metal foil laminated to a resin film. Such a laminated material is lightweight and flexible compared to stainless steel sheets etc., and therefore can be easily formed into an extremely thin flat shape. The laminated material can be fused by heat, which facilitates the sealing of cells. Additionally, it has a structure in which a metal foil layer having low gas permeability and a resin layer having excellent chemical stability are laminated together, and the former (i.e., the metal foil) functions to inhibit permeation of moisture, oxygen and others while the latter (i.e., the resin layer) functions as a protective layer against oxygen and alkali. With this structure, the laminated material, as a whole, excels in gas permeability as well as in chemical stability. Accordingly, the laminated material has been regarded as a useful material for forming a casing for sheet-like cells which accommodate highly reactive electric energy generating elements.

Despite the above advantages, there has not been developed yet a sheet-like sealed non-aqueous electrolyte cell which has a casing made from a laminated material and provides satisfactory service life, because the degree of sealing in the prior art electric cells decreases with time.

SUMMARY OF THE INVENTION

The present invention is directed to overcoming the above-described problem presented by the prior art sealed non-aqueous electrolyte cells having a casing made from a laminated material. One of the objects of the invention is therefore to provide a sheet-like sealed non-aqueous electrolyte cell having a laminated material casing, which cell includes a means for preventing a trace amount of water present therein from causing deterioration in the performance of the cell.

The above object can be achieved by a sealed non-aqueous electrolyte cell according to the invention having: a casing that is made from a laminated material comprising a metal foil and a resin film; and an inorganic oxide fine powder that is not an electrode active material and is accommodated within the casing together with electric energy generating elements.

Generally, sealed non-aqueous electrolyte cells are apt to be damaged by moisture but it is difficult to completely exclude moisture from the cells in the fabrication process. Therefore, a finished product often includes water which was originally contained, for example, in an organic solvent (a component of the electrolyte) or derived from moisture on the cell members. Water entrapped in the cell reacts with the electrolyte salt and the active material and becomes a direct cause of deterioration in the performance of the cell. Hydrofluoric acid or the like, which is a product of the reaction between cell components and water entrapped within the cell, acts on the sealing parts of the casing, decreasing adhesive strength and therefore the degree of sealing in the parts. This causes a vicious circle in which the decreased degree of sealing allows penetration of moisture and oxygen from the outside of the cell and the penetrating moisture causes a further decrease in the degree of sealing. Finally, there occurs leakage, resulting in the expiration of the cell's life.

It is understood from the above that the decreased degree of sealing is a cause of shortening the service life of the prior art sheet-like sealed non-aqueous electrolyte cells.

As opposed to the prior art cell, the present invention having the above-described structure includes an inorganic oxide fine powder which is not an electrode active material and this fine powder adsorbs and inactivates a trace amount of water which has been present in the cell since completion of the fabrication or moisture which has penetrated into the cell after the fabrication. The fine powder also adsorbs hydrofluoric acid etc. produced by the reaction between the water within the cell and the cell components. Additionally, the inorganic oxide fine powder contained in the cell enhances the viscosity of the cell components thereby restricting scatter and evaporation of the cell components and the reaction products including hydrofluoric acid. With this arrangement, the extent to which hydrofluoric acid and others come in direct contact with the sealing parts of the casing can be reduced, which, in consequence, reduces the possibility of degradation in the sealing parts.

By virtue of the inorganic oxide fine powder favourably functioning as described above, it is possible to prevent a decrease in the performance of the cell directly caused by the reaction between the cell components and water and to prevent a decrease in the degree of sealing caused by the reaction products of the electrolyte salt etc. and water. This leads to an increase in the cycling capability of the cell. In short, the invention has the capability to prevent a decrease in the performance of a cell, which decrease is attributable to the reaction between water penetrated into the cell and the components of the cell.

The sealing parts defined herein are the parts where the opposed seal edges of the laminated material are bonded to each other to seal the cell. Bonding of these edges is usually achieved by thermal fusion but may be achieved by an adhesive agent, because the use of an adhesive agent does not spoil the effects of adding the inorganic oxide fine powder.

In the invention, the inorganic oxide fine powder may be contained in an electrolyte.

The electrolyte of a non-aqueous electrolyte cell is usually composed of an organic solvent and an electrolyte salt such as lithium salt, and the organic solvent contains trace amounts of water while the electrolyte salt is highly reactive with water. In cases where the electrolyte includes the inorganic oxide fine powder, the fine powder absorbs water contained in the organic solvent so that the hydrolysis reaction between the water in the organic solvent and the electrolyte salt can be restrained. Even if reaction products are produced to some extent by hydrolysis, the reaction products will be adsorbed by the inorganic oxide fine powder. In addition, the inorganic oxide fine powder contained in the electrolyte enhances the viscosity of the electrolyte so that scatter and evaporation of the components of the electrolyte and the reaction products can be restrained. Accordingly, when blended with the electrolyte, the inorganic oxide fine powder can work effectively to restrain a decrease in the degree of sealing.

In the invention, the inorganic oxide fine powder may have an average particle diameter of 5 µm or less.

When the inorganic oxide fine powder has a particle diameter of 5 µm or less, the total surface area of the fine powder is large enough to provide a strong power for adsorbing water, hydrofluoric acid and others and to favourably increase the viscosity of the electrolyte. This arrangement restrains the degree of sealing from decreasing and as a result, improved cycling capability can be ensured.

In the invention, the inorganic oxide fine powder may be contained in amounts of 0.05 to 20% by weight of the electrolyte.

When the amount of the inorganic oxide fine powder contained in the electrolyte is 0.05 wt % or more, the fine powder can satisfactorily adsorb water, hydrofluoric acid and others. Therefore, the degradation of the sealing parts of the casing can be more effectively restrained which ensures that leakage caused by a decrease in the degree of sealing is prevented. If the amount of the inorganic oxide fine powder exceeds 20 wt %, the fine powder causes an undesirable increase in the viscosity of the electrolyte, which entails a decrease in the discharge capacity of the cell. In addition, energy density decreases with the increasing amount of the inorganic oxide fine powder that is not an electrode active material. In order to improve the service life of the cell without impairing its discharge rate characteristic, the suitable amount of the inorganic oxide fine powder based on the weight of the electrolyte should be in the range of from 0.05 to 20 wt %.

The electrolyte in the invention may be a solid polymer electrolyte.

Since solid polymer electrolytes are inferior in ionic conductivity to liquid electrolytes, a preferred shape for the cell is a thin flat shape. The reason for this is that, when the cell is formed into a thin flat shape, the distance between the anode and cathode can be shortened, facilitating ionic conduction between the anode and cathode. In cases a rigid metal sheet such as stainless steel sheets is used as the material of a casing, the difficulty lies in forming such a sheet into a thin flat shape. Also, it is difficult to insert the electric energy generating elements into a rigid, extremely thin casing and therefore, when assembled into a cell, the electric energy generating elements easily get damaged so that a high quality cell is hardly obtained.

As opposed to cells having a metal casing, the present invention utilizes a soft laminated material for forming a cell casing, which material can be readily formed into a thin flat shape and the cell casing itself can flexibly be changed in shape with great latitude, so that the electric energy generating elements including a solid polymer electrolyte can be accommodated within the casing without getting damaged.

Accordingly, the effect of the invention is significant especially when the invention is applied to a sheet-like sealed non-aqueous electrolyte cell comprising a solid polymer electrolyte.

The electrolyte employed in the invention may be a solid polymer electrolyte containing $LiPF_6$ as an electrolyte salt.

$LiPF_6$ and $LiBF_4$ react with moisture which was originally present in the cell or which has penetrated into the cell, to form a hydrofluoric acid or the like which could be a cause of degradation in the sealing parts of the cell casing. Where the inorganic oxide fine powder is added to the electrolyte containing $LiPF_6$ as an electrolyte salt, the inorganic oxide fine powder can effectively adsorb the hydrofluoric acid and others. Therefore, the cell containing the inorganic oxide fine powder is less likely to undergo a decrease in the degree of sealing, compared to the prior art cells containing no inorganic oxide fine powder. In short, when the invention is applied to a sheet-like sealed non-aqueous electrolyte cell comprising a solid polymer electrolyte, containing $LiPF_6$ as an electrolyte salt, it can more significantly exert its desirable effect.

According to the invention, the inorganic oxide fine powder may comprise alumina, magnesia, or a complex oxide composed of alumina and magnesia.

Alumina, magnesia, and complex oxides composed of alumina and magnesia have high chemical stability to the components of the electric energy generating elements such as lithium and have excellent moisture absorbency. Therefore, use of these materials as the inorganic oxide fine powder makes it possible to more reliably restrain a decrease in the degree of sealing in the sealing parts of the casing.

Referring to FIGS. 1 to 5, there will be explained a structural configuration of a non-aqueous electrolyte cell according to a preferred embodiment of the invention.

As shown in FIG. 2, the non-aqueous electrolyte cell of the invention is designed to have electric energy generating elements 6 housed within a casing 1 made from a laminated material. The casing 1 is made from a laminated material 20 having a five-layer structure as shown in FIG. 5 and is heat sealed at first to third sealing parts 2a to 2c as shown in FIG. 1 to hermetically seal the cell. It is seen from FIG. 1 that, at the first sealing part 2a, two opposed edges of the casing 1 are heat sealed with the positive and negative collector terminals 7, 8 interposed therebetween, the terminals 7, 8 being respectively attached to an anode 3 and to a cathode 4 and guided outwardly from the cell so that electric energy generated in the cell can be taken from the cell.

The electric energy generating elements 6 accommodated in the casing 1 are constituted by the anode 3 having active material layers that contain $LiCoO_2$ as a major component and are formed on both surfaces of a positive collector; the cathode 4 having active material layers that contain a carbon material as a major component and are formed on both surfaces of a negative collector; and a separator 5 positioned between the anode 3 and the cathode 4. As the separator 5, there may be used a separator, in a narrow sense, having a function of separating the anode 3 and the cathode 4 from each other. Alternatively, an electrolytic film may be used as a separator which is composed of an electrolyte carried by a porous body of polyethylene or the like. This embodiment uses an electrolytic film composed of an electrolyte carried by a porous body and the electrolyte contains an inorganic oxide fine powder.

The structure of the laminated material 20 will be described in detail. As shown in the sectional view of FIG. 5, there is provided a 20 µm-thick metal layer 1a made from aluminium. The metal layer 1a has, on the outer surface, a first polypropylene layer 1b (which is to be positioned on the periphery of the cell) having a thickness of 20 µm and, on the inner surface, a second polypropylene layer 1c (which is to be positioned inside the cell) having a thickness of 60 µm. The metal layer 1a and the first polypropylene layer 1b are bonded to each other with a 5 µm-thick dry laminate adhesive layer 1d, whereas the metal layer 1a and the second polypropylene layer 1c are bonded to each other with a 5 µm-thick carboxylic acid-denatured polypropylene layer 1e in which a carboxyl group is added to polypropylene.

The carboxylic acid-denatured polypropylene disclosed herein is made by adding a carboxylic acid to polypropylene by, for example, graft polymerization or block polymerization. Addition of a carboxylic acid promotes the heat sealing of polypropylene with respect to metal. In this embodiment (shown in FIGS. 1 to 5), carboxylic acid-denatured polypropylene is adhered to the peripheries of the collector terminals 7, 8. Specifically, there are formed carboxylic acid-denatured polypropylene layers 9 and 10 on the peripheries of the collector terminals 7, 8, which peripheries abut on the inner surface of the first sealing part 2a. By use of the collector terminals 7, 8 having such a structure, when the first sealing part 2a is subjected to heat sealing, the collector terminals 7, 8 (metal) and the second polypropylene layer 1c of the laminated material are strongly bonded to each other through the carboxylic acid-denatured polypropylene layers 9, 10, so that perfect bonding can be established at the first sealing part 2a which is most likely to lose adhesiveness. When the above structure is employed, the resultant sheet-like sealed non-aqueous electrolyte cell is less susceptible to deterioration in the degree of sealing and has high cycling life.

The sheet-like sealed non-aqueous electrolyte cell of the above structure according to the invention is fabricated in the following process.

(1) The opposed edges of the above-described laminated material of the five layer structure are overlapped (the width of the overlapped portion is 20 mm) and the overlapped edges (2b in FIG. 2) are heat sealed using a high-frequency induction heater, so as to form the laminated material into a tubular body.

(2) One opening of the tubular body is closed using the high-frequency induction heater to form a fused portion having a width of 10 mm (2c in FIG. 3). Thus, a tubular body having a closed bottom (i.e., bag-shaped cell casing) is formed in which the second sealing part 2b and the third sealing part 2c are respectively sealed.

(3) The electric energy generating elements constituted by the anode 3, cathode 4, separator 5, and electrolyte are introduced into the tubular body having a closed bottom through the opening thereof (i.e., the first sealing part 2a which has not been fused yet). At that time, the collector terminals 7, 8 attached to the anode 3 and cathode 4 are guided so as to project from the cell through the opening. It should be noted that the peripheries of the collector terminals 7, 8 are provided beforehand with the carboxylic acid-denatured polypropylene layers 9, 10 and that the anode and cathode are inserted into the casing such that the layers 9, 10 are brought into contact with the inner face of the first sealing part 2a.

(4) Subsequently, the opposed edges of the casing material at the first sealing part 2a are heat sealed (the fused portion has a width of 10 mm) with the collector terminals 7, 8 interposed therebetween, using the high-frequency induction heater.

(5) Through the above process, the sheet-like sealed non-aqueous electrolyte cell having the laminate casing is constructed according to the invention. This cell has a width of 42 mm, length of 100 mm and thickness of 1.7 mm.

One of the important aspects of the invention resides in the use of the inorganic oxide fine powder contained in the cell, which fine powder is not an active material. While the inorganic oxide fine powder is added to the electrolyte in the above embodiment, the same desired effects can be achieved by the inorganic oxide fine powder added to other elements within the cell. More concretely, the fine powder may be present within the electric energy generating elements such as the anode, cathode and separator, or within a gap between such electric energy generating elements and the casing. It should, however, be noted that the inorganic oxide fine powder is preferably added to the electrodes and more preferably to the electrolyte. The reason for this is that the electrodes include highly reactive active materials, the electrolyte tends to entrap moisture, and the electrolyte salt, which is a component of the electrolyte, is highly reactive with moisture. Another reason is that the electrolyte has high mobility compared to other electric energy generating elements.

Alternatively, the following producing method may be employed in place of the method described earlier. A strip of the laminated material is looped with the opposed edges overlapped. After the overlapped edges (indicated by 2b in FIG. 2) are heat sealed, appropriate pressure is applied to the overlapped edges thereby to form a flat tubular body. The electric energy generating part, in which the anode and cathode are opposed with the separator interposed between, is inserted into the flat tubular body. At that time, the positive and negative collector terminals respectively attached to the anode and cathode are allowed to project outward from the tubular body. Then, the opening (2a in FIG. 1) through which the positive and negative collector terminals project outward is sealed by heat sealing with the collector terminals being interposed. Thereafter, the electrolyte is introduced through the other opening (2c) and this opening is sealed by heat sealing (see FIG. 3) thereby fabricating a finished cell.

Examples of the inorganic oxide fine powder used in the invention include alumina (aluminium oxide $Al_2O_3$), silica (silicon dioxide $SiO_2$), zeolite, magnesia (MgO), titania ($TiO_2$) and complex oxides produced by mixing these oxides in various combinations. Of these materials, alumina, magnesia and complex oxides composed of alumina and magnesia are preferred, particularly for a lithium cell, because they exert high absorbency to moisture and to chemical substances. They are particularly useful for the electrolyte containing $LiPF_6$ for the following reasons.

$LiPF_6$ reacts with water originally present in the cell and with water penetrating through the sealing parts, to produce a hydrofluoric acid which adversely affects the sealing parts (bonded parts) resulting in a decrease in the degree of sealing. This causes a vicious circle in which once the degree of sealing decreases, moisture penetrates into the cell from outside so that the yield of hydrofluoric acid increases causing more corrosion in the sealed parts. If alumina, magnesia or a complex oxide composed of alumina and magnesia exists as the inorganic oxide fine powder, it absorbs moisture and the hydrofluoric acid that is a hydrolysis product of $LiPF_6$. Therefore, decreases in the performance of the cell and in the degree of sealing due to the presence of moisture and hydrofluoric acid can be restrained. In addition, since alumina, magnesia and complex oxides composed of alumina and magnesia enhance the viscosity of the electrolyte and reduce the scatter and vaporization of the electrolyte, there is lesser contact between the sealing parts and hydrofluoric acid etc., which consequently restrains the deterioration of the sealing parts.

The suitable amount (represented by content) of the inorganic oxide fine powder to be added to the electrolyte in the invention ranges from 0.01 to 20 wt %. If the content is below 0.01 wt %, absorbency to the hydrofluoric acid is lacking, so that the deterioration of the sealing parts cannot be satisfactorily prevented. On the other hand, if it exceeds 20 wt %, the electrolyte has excessive viscosity and the discharge rate characteristic (1C/0.2C capacity ratio) of the cell unfavourably decreases.

The average particle diameter of the inorganic oxide fine powder is preferably 20 $\mu$m or less and more preferably 5 $\mu$m or less. By use of the inorganic oxide fine powder having an average particle diameter of 5 $\mu$m or less, enough specific surface area can be ensured to absorb hydrofluoric acid etc. to be produced. On the other hand, if it exceeds 20 $\mu$m, enough specific surface area cannot be obtained so that hydrofluoric acid etc. cannot be satisfactorily absorbed.

A lower limit is not particularly specified for the particle diameter of the inorganic oxide fine powder, because the specific surface area and therefore absorbency of the powder increase as the powder becomes finer. Therefore, a lower limit for the particle diameter may be determined appropriately taking the pulverization technique etc. into account. It suffices to say that the inventors have found that desired results are obtainable with the inorganic oxide fine powder having an average particle diameter of 0.005 $\mu$m.

Examples of the solvent constituting the electrolyte include organic solvents such as ethylene carbonate, vinylene carbonate and propylene carbonate, and solutions prepared by mixing these solvents. Other examples are solvents prepared by mixing any of the above solvents and low-boiling point solvents such as dimethyl carbonate, diethyl carbonate, 1, 2-dimethoxyethane, 1, 2-diethoxyethane, and ethoxymethoxyethane.

Apart from $LiPF_6$ which has been noted earlier, examples of the electrolyte salt to be dissolved into these solvents include $LiBF_4$, $Li(CF_3SO_2)_2N$, $LiClO_4$ and $LiCF_3SO_3$.

As examples of the electrolyte, liquid electrolytes (electrolytic solutions), solid polymer electrolytes and gel solid polymer electrolytes are enumerated. In cases where a solid polymer electrolyte or gel solid polymer electrolyte is used, the role of a separator may be assigned to the electrolyte and such an electrolyte is the preferred element to which inorganic oxide fine powder is added.

Although the laminated material has a five-layer structure in the foregoing embodiment, it may have a different structure on condition that the structure is composed of two or more layers including at least one metal layer and one resin layer adhesive to the metal layer. However, the materials of the metal layer and the resin layer are not particularly specified. Examples of the metal foil constituting the laminated material include aluminium, steel, stainless steel and copper. Examples of the resin to be subjected to heat sealing include polyethylene, polypropylene, denatured polyethylene, denatured polypropylene, and ethylene-propylene copolymers.

While carboxylic acid-denatured polypropylene is used to form the layers 9, 10 around the collector terminals (see FIG. 4) in the foregoing embodiment, carboxylic acid-denatured polyethylene may be used in place of carboxylic acid-denatured polypropylene. Note that when carboxylic acid-denatured polyethylene is used, it is desirable in view of adhesive strength to use polyethylene as the non-denatured resin.

Although he foregoing embodiment has been discussed in the concept of the casing 1 having the first to third sealing parts 2a to 2c, the sealing parts 2b and 2c are not necessarily provided in cases where an integral casing is used. In such cases, there must be at least one sealing part (corresponding to the first sealing part 2a) in order to insert the electric energy generating elements and let the collector terminals project outwardly from the cell. Since the degree of sealing is most likely to decrease in the first sealing part. 2a through which the collector terminals project, the effect of the invention can be fully achieved even when it is applied to cells having only one sealing part.

Additionally, although the thickness of the second polypropylene layer 1c of the foregoing embodiment is 60 $\mu$m, the thickness is not limited to such a value but may fall within the range of from 20 to 100 $\mu$m. The thickness of the metal layer 1a is not necessarily set at 20 $\mu$m as specified in the foregoing embodiment but may range from 8 to 50 $\mu$m.

Finally, the active material for the anode is not limited to the materials noted above but other materials such as $LiNiO_2$, $LiMnO_2$ and $LiFeO_2$ may be used.

DESCRIPTION OF THE PREFERRED EMBODIMENTS

Figure 1:
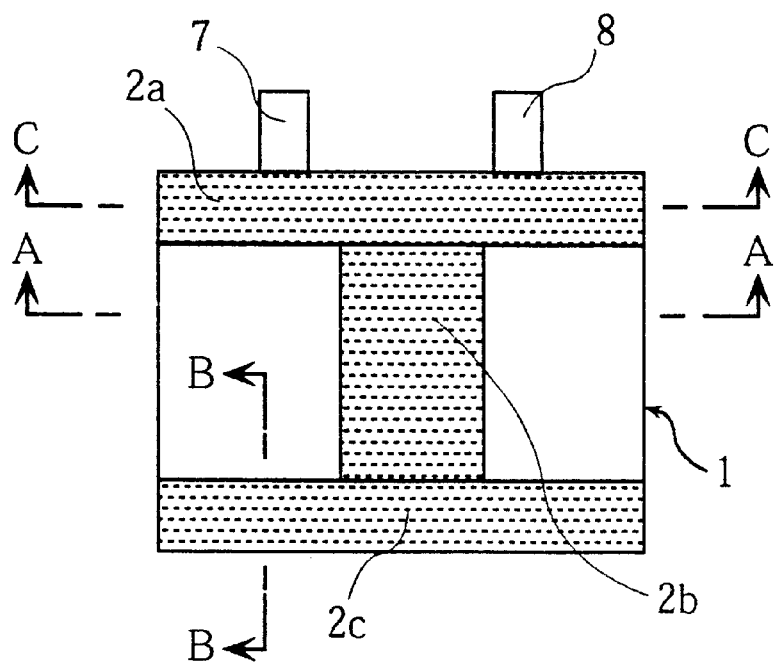
FIG. 1 is a plane view schematically showing the external appearance of a sealed non-aqueous electrolyte cell having a laminate casing.
Figure 2:
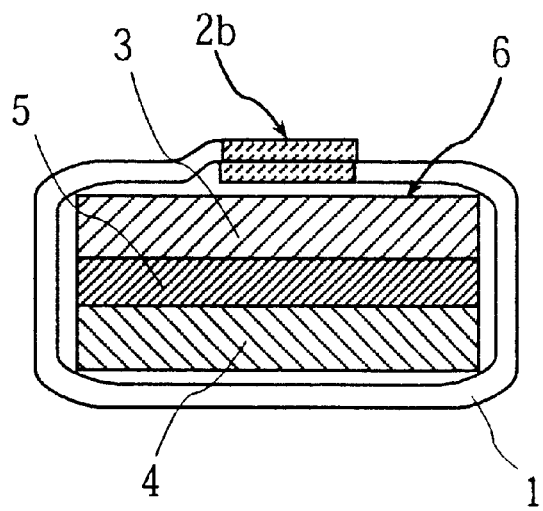
FIG. 2 is a sectional view taken on line A—A of FIG. 1.
Figure 3:
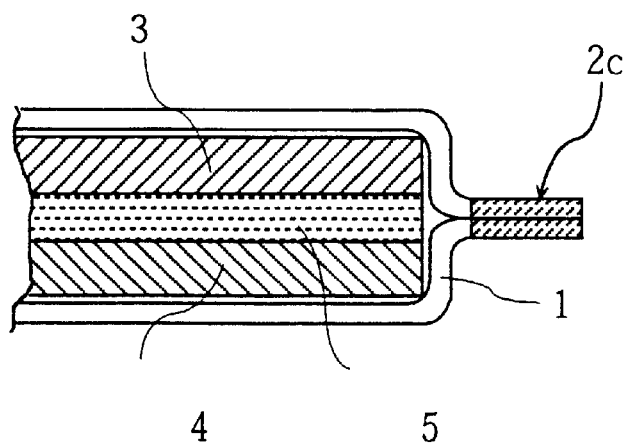
FIG. 3 is a sectional view taken on line B—B of FIG. 1.
Figure 4:
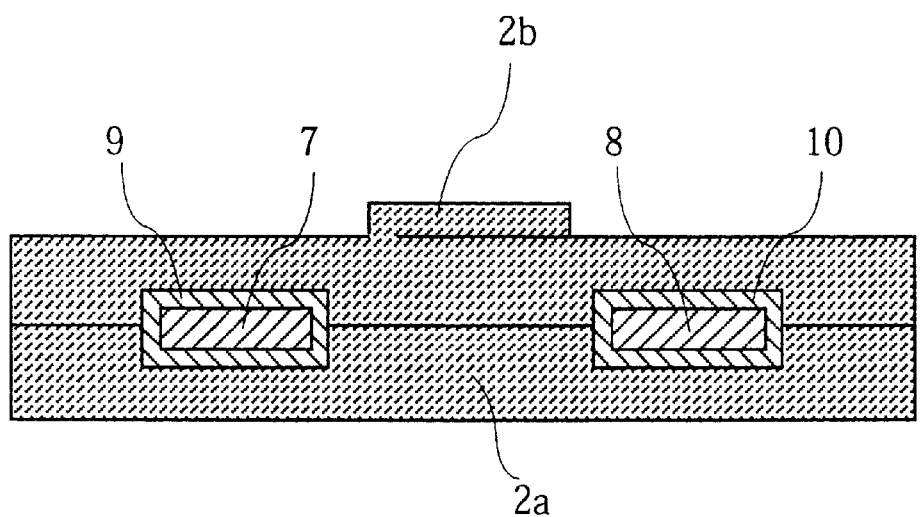
FIG. 4 is a sectional view taken on line C—C of FIG. 1.
Figure 5:
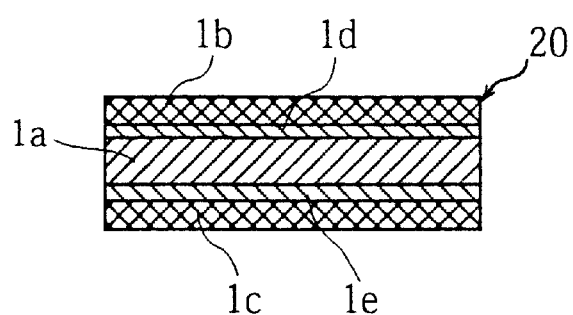
FIG. 5 is a sectional view of a laminated material used for forming the laminate casing.

The invention will be concretely described by way of preferred embodiments. The cells prepared in the following examples differ from one another in terms of the composition of the alumina-containing electrolytic solution, the separator, and the composition of the electrolyte contained within the electrodes but they have the same basic structure as previously described with reference to FIGS. 1 to 5. Therefore, the differences between the cells of the respective examples will be mainly explained in the following description.

EXAMPLE 1

1 mol (1M) of $LiPF_6$ was dissolved in a solution prepared by mixing ethylene carbonate (EC) and diethyl carbonate (DEC) in the ratio of 3:7 to produce an electrolytic solution. Then, alumina (of which moisture content measured by Karl Fisher's Method was 1000 ppm or less) having an average particle diameter of 0.05 $\mu$m was added to the electrolytic solution thereby preparing an alumina-containing electrolytic solution having an alumina content of 5 wt %. A sealed non-aqueous electrolyte cell of Example 1 was prepared using the above alumina-containing electrolytic solution as an electrolytic solution.

EXAMPLE 2

A sealed non-aqueous electrolyte cell of Example 2 was prepared in the same process as that of Example 1 except that $LiBF_4$ was used in place of $LiPF_6$.

EXAMPLE 3

A sealed non-aqueous electrolyte cell of Example 3 was prepared in the same process as that of Example 1 except that 1M of, $Li(CF_3SO_2)_2N$ was used in place of 1M of $LiPF_6$.

EXAMPLE 4

A sealed non-aqueous cell of Example 4 was prepared in the same process as that of Example 1 except that the average particle diameter of the alumina used in Example 4 was 0.005 $\mu$m.

EXAMPLE 5

A sealed non-aqueous electrolyte cell of Example 5 was prepared in the same process as that of Example 1 except that the average particle diameter of the alumina used in Example 5 was 0.5 $\mu$m.

EXAMPLE 6

A sealed non-aqueous electrolyte cell of Example 6 was prepared in the same process as that of Example 1 except that the average particle diameter of the alumina used in Example 6 was 2 $\mu$m.

EXAMPLE 7

A sealed non-aqueous electrolyte cell of Example 7 was prepared in the same process as that of Example 1 except that the average particle diameter of the alumina used in Example 7 was 5 $\mu$m.

EXAMPLE 8

A sealed non-aqueous electrolyte cell of Example 8 was prepared in the same process as that of Example 1 except that the average particle diameter of the alumina used in Example 8 was 10 $\mu$m.

It should be noted that Examples 1, 4 to 8 have the same alumina content, that is, 5 wt % but differ from one another only in the average particle diameter of alumina.

EXAMPLE 9

A sealed non-aqueous electrolyte cell of Example 9 was prepared in the same process as that of Example 1 except that alumina having an average particle diameter of 0.05 $\mu$m was contained in an amount of 0.01 percent by weight of the total amount (i.e., the amount of alumina and electrolytic solution: this basis is applied to the following examples) of the alumina-containing electrolytic solution.

EXAMPLE 10

A sealed non-aqueous electrolyte cell of Example 10 was prepared in the same process as that of Example 1 except that the alumina content of the alumina-containing electrolytic solution used in Example 10 was 0.05 wt %.

EXAMPLE 11

A sealed non-aqueous electrolyte cell of Example 11 was prepared in the same process as that of Example 1 except that the alumina content of the alumina-containing electrolytic solution used in Example 11 was 0.1 wt %.

EXAMPLE 12

A sealed non-aqueous electrolyte cell of Example 12 was prepared in the same process as that of Example 1 except that the alumina content of the alumina-containing electrolytic solution used in Example 12 was 1 wt %.

EXAMPLE 13

A sealed non-aqueous electrolyte cell of Example 13 was prepared in the same process as that of Example 1 except that the alumina content of the alumina-containing electrolytic solution used in Example 13 was 10 wt %.

EXAMPLE 14

A sealed non-aqueous electrolyte cell of Example 14 was prepared in the same process as that of Example 1 except that the alumina content of the alumina-containing electrolytic solution used in Example 14 was 20 wt %.

EXAMPLE 15

A sealed non-aqueous electrolyte cell of Example 15 was prepared in the same process as that of Example 1 except that the alumina content of the alumina-containing electrolytic solution used in Example 15 was 30 wt %.

It should be noted that Examples 9 to 15 have the same average particle diameter of alumina, that is 0.05 $\mu$m, but are different from one another only in alumina content.

EXAMPLE 16

An electrolytic solution prepared by dissolving 1 mol of $LiPF_6$ in the EC/DEC (3/7) electrolytic solution was mixed with polyethylene glycol diacrylate (molecular weight= about 400: this component is represented by PEGDAC in TABLES) in the weight ratio of 4:1. Then, 1,000 ppm of 2, 4, 6-trimethyl benzoyl diphenylphosphine oxide was added to this mixture as a photo polymerization initiator to prepare a prepolymer composition 1.

5 wt % alumina (average particle diameter=0.05 $\mu$m) was added to the prepolymer composition 1 to produce an alumina-containing prepolymer composition which was then impregnated into a polyethylene porous body similar to that used in Example 1. After the impregnation, the product was placed between glass sheets and exposed to light illumination thereby to prepare an alumina-containing solid polymer electrolyte film having a thickness of about 25 $\mu$m.

The alumina-containing solid polymer electrolyte film was used as the separator 5 and the electrolytic solution containing 1 mol of $LiPF_6$ dissolved in the EC/DEC (3/7) solution was introduced in the cell as the electrolytic solution for the electrodes. Thus, a sealed non-aqueous electrolyte cell according to Example 16 was prepared in the same process as that of Example 1 except the above procedure.

EXAMPLE 17

An electrolytic solution prepared by dissolving 1 mol of $LiPF_6$ in the EC/DEC (3/7) solution and polyethylene glycol diacrylate were mixed in the weight ratio of 4:1. Then, 1,000 ppm of benzoyl peroxide was added to this mixture as a thermal polymerization initiator to prepare a prepolymer composition 2.

5 wt % alumina (average particle diameter=0.05 $\mu$m) was added to the prepolymer composition 2 to produce an alumina-containing prepolymer composition of Example 17 which was used in place of the alumina-containing electrolytic solution of Example 1 in assembling a cell.

After assembly, the cell was allowed to stand for about three hours such that the alumina-containing prepolymer composition was fully impregnated into a polyethylene porous body (separator 5). Thereafter, the cell was heated to about 80° C. to thermally polymerize the polyethylene glycol diacrylate contained in the composition. Thus, a sealed non-aqueous electrolyte cell was prepared according to Example 17, which contained a gel solid polymer electrolyte including alumina.

EXAMPLE 18

An alumina-containing prepolymer composition was prepared through the same process as that of Example 16 except that the 1M-LiPF$_6$.EC/DEC (3/7) solution used in Example 16 was replaced with a solution prepared by dissolving 1 mol of LiBF$_4$ in the EC/DEC (3/7) solution. Then, a sealed non-aqueous electrolyte cell according to Example 18 was prepared through the same process as that of Example 16 except that the above electrolytic solution (1M-LiBF$_4$.EC/DEC (3/7) solution) was used as the electrolytic solution for the electrodes.

EXAMPLE 19

An alumina-containing prepolymer composition was prepared through the same process as that of Example 16 except that the 1M-LiPF$_6$.EC/DEC (3/7) solution used in Example 16 was replaced with a solution prepared by dissolving 1 mol of Li(CF$_3$SO$_2$)$_2$N in the EC/DEC (3/7) solution. Then, a sealed non-aqueous electrolyte cell according to Example 19 was prepared through the same process as that of Example 16 except that the above electrolytic solution (1M-Li(CF$_3$SO$_2$)$_2$N.EC/DEC (3/7) solution) was used as the electrolytic solution for the electrodes.

Note that Examples 16 to 19 are the same in the average particle diameter of alumina (0.05 μm) and in alumina content (5 wt %) but a different electrolytic solution and a different prepolymer composition were used in each Example.

EXAMPLE 20

Alumina having an average particle diameter of 0.005 μm was added to the same composition as the prepolymer composition 1 of Example 16 to prepare an alumina-containing prepolymer composition containing 5 wt % alumina. Except the use of this alumina-containing prepolymer composition in place of the composition of Example 16, the same process as that of Example 16 was taken to produce a sealed non-aqueous electrolyte cell according to Example 20.

It should be noted that Examples 16, 20 to 24 have the same alumina content of 5 wt %, but are varied only in the average particle diameter of alumina.

EXAMPLE 21

Except the use of alumina having an average particle diameter of 0.5 μm, the same process as that of Example 20 (or Example 16) was taken to produce a sealed non-aqueous electrolyte cell according to Example 21.

EXAMPLE 22

A sealed non-aqueous electrolyte cell according to Example 22 was prepared in the same process as that of Example 20 (or Example 16) except that the average particle diameter of the alumina used in Example 22 was 2 μm.

EXAMPLE 23

A sealed non-aqueous electrolyte cell according to Example 23 was prepared in the same process as that of Example 20 (or Example 16) except that the average particle diameter of the alumina used in Example 23 was 5 μm.

Example 24

A sealed non-aqueous electrolyte cell according to Example 24 was prepared in the same process as that of Example 20 (or Example 16) except that the average particle diameter of the alumina used in Example 24 was 10 μm.

EXAMPLE 25

Alumina having an average particle diameter of 0.05 μm was added to the same composition as the prepolymer composition 1 of Example 16 to prepare an alumina-containing prepolymer composition containing alumina in an amount of 0.01% by weight of the total amount. Then, a sealed non-aqueous electrolyte cell according to Example 25 was prepared in the same process as that of Example 16 except that the above composition was used instead of the alumina-containing prepolymer composition of Example 16.

It should be noted that Examples 25 to 31 have the same average alumina particle diameter of 0.05 μm but are varied only in alumina content.

EXAMPLE 26

A sealed non-aqueous electrolyte cell according to Example 26 was prepared in the same process as that of Example 25 (or Example 16) except that the alumina content of the alumina-containing prepolymer composition used in Example 26 was 0.05 wt %.

EXAMPLE 27

A sealed non-aqueous electrolyte cell according to Example 27 was prepared in the same process as that of Example 25 (or Example 16) except that the alumina content of the alumina-containing prepolymer composition used in Example 27 was 0.1 wt %.

EXAMPLE 28

A sealed non-aqueous electrolyte cell according to Example 28 was prepared in the same process as that of Example 25 (or Example 16) except that the alumina content of the alumina-containing prepolymer composition used in Example 28 was 1 wt %.

EXAMPLE 29

A sealed non-aqueous electrolyte cell according to Example 29 was prepared in the same process as that of Example 25 (or Example 16) except that the alumina content of the alumina-containing prepolymer composition used in Example 29 was 10 wt %.

EXAMPLE 30

A sealed non-aqueous electrolyte cell according to Example 30 was prepared in the same process as that of Example 25 (or Example 16) except that the alumina content of the alumina-containing prepolymer composition used in Example 30 was 20 wt %.

EXAMPLE 31

A sealed non-aqueous electrolyte cell according to Example 31 was prepared in the same process as that of Example 25 (or Example 16) except that the alumina content of the alumina-containing prepolymer composition used in Example 31 was 30 wt %.

EXAMPLE 32

A sealed non-aqueous electrolyte cell according to Example 32 was prepared in the same process as that of Example 17 except that when preparing a prepolymer composition, an electrolytic solution prepared by dissolving 1 mol of $LiBF_4$ in the EC/DEC (3/7) solution was used instead of the 1M-$LiPF_6$·EC/DEC (3/7) solution which was used in the preparation of the prepolymer composition 2 of Example 17.

EXAMPLE 33

A sealed non-aqueous electrolyte cell according to Example 33 was prepared in the same process as that of Example 17 except that when preparing a prepolymer composition, an electrolytic solution prepared by dissolving 1 mol of $Li(CF_3SO_2)_2N$ in the EC/DEC (3/7) solution was used instead of the 1M-$LiPF_6$.EC/DEC (3/7) solution which was used in the preparation of the prepolymer composition 2 of Example 17.

It should be noted that Examples 17, 32, 33 differ from one another only in the kind of electrolyte salt which constitutes the electrolytic solution.

EXAMPLE 34

Alumina having an average particle diameter of 0.005 $\mu$m was added to the same composition as the prepolymer composition 2 of Example 17 to prepare an alumina-containing prepolymer composition containing alumina in an amount of 5% by weight of the total amount. Then, a sealed non-aqueous electrolyte cell according to Example 34 was prepared in the same process as that of Example 17 except that the above prepolymer composition was used instead of the alumina-containing prepolymer composition of Example 17.

EXAMPLE 35

A sealed non-aqueous electrolyte cell according to Example 35 was prepared in the same process as that of Example 34 (or Example 17) except that the alumina used in Example 35 had an average particle diameter of 0.5 $\mu$m.

EXAMPLE 36

A sealed non-aqueous electrolyte cell according to Example 36 was prepared in the same process as that of Example 34 (or Example 17) except that the alumina used in Example 36 had an average particle diameter of 2 $\mu$m.

EXAMPLE 37

A sealed non-aqueous electrolyte cell according to Example 37 was prepared in the same process as that of Example 34 (or Example 17) except that the alumina used in Example 37 had an average particle diameter of 5 $\mu$m.

EXAMPLE 38

A sealed non-aqueous electrolyte cell according to Example 38 was prepared in the same process as that of Example 34 (or Example 17) except that the alumina used in Example 38 had an average particle diameter of 10 $\mu$m.

Note that Examples 34 to 38 have the same alumina content of 5 wt % but differ from one another only in the average particle diameter of alumina.

EXAMPLE 39

Alumina having an average particle diameter of 0.05 $\mu$m was added to the same composition as the prepolymer composition 2 of Example 17 to prepare an alumina-containing prepolymer composition containing alumina in an amount of 0.01% by weight of the total amount. Then, a sealed non-aqueous electrolyte cell according to Example 39 was prepared in the same process as that of Example 17 except that the above prepolymer composition was used instead of the alumina-containing prepolymer composition of Example 17.

Note that Examples 39 to 45 have the same alumina average particle diameter of 0.05 $\mu$m but differ from one another only in alumina content.

EXAMPLE 40

A sealed non-aqueous electrolyte cell according to Example 40 was prepared in the same process as that of Example 39 (or Example 17) except that the alumina-containing prepolymer composition used in Example 40 contained 0.05 wt % alumina.

EXAMPLE 41

A sealed non-aqueous electrolyte cell according to Example 41 was prepared in the same process as that of Example 39 (or Example 17) except that the alumina-containing prepolymer composition used in Example 41 contained 0.1 wt % alumina.

EXAMPLE 42

A sealed non-aqueous electrolyte cell according to Example 42 was prepared in the same process as that of Example 39 (or Example 17) except that the alumina-containing prepolymer composition used in Example 42 contained 1 wt % alumina.

EXAMPLE 43

A sealed non-aqueous electrolyte cell according to Example 43 was prepared in the same process as that of Example 39 (or Example 17) except that the alumina-containing prepolymer composition used in Example 43 contained 10 wt % alumina.

EXAMPLE 44

A sealed non-aqueous electrolyte cell according to Example 44 was prepared in the same process as that of Example 39 (or Example 17) except that the alumina-containing prepolymer composition used in Example 44 contained 20 wt % alumina.

EXAMPLE 45

A sealed non-aqueous electrolyte cell according to Example 45 was prepared in the same process as that of Example 39 (or Example 17) except that the alumina-containing prepolymer composition used in Example 45 contained 30 wt % alumina.

EXAMPLE 46

1 mol (1M) of $LiPF_6$ was dissolved in a solution prepared by mixing ethylene carbonate (EC) and diethyl carbonate (DEC) in the ratio of 3:7, to produce an electrolytic solution. Then, alumina having an average particle diameter of 0.005 μm was added to the electrolytic solution thereby preparing an alumina-containing electrolytic solution having an alumina content of 0.05 wt %. A sealed non-aqueous electrolyte cell according to Example 46 was prepared in the same process as that of Example 1 except that the above alumina-containing electrolytic solution was used as an electrolytic solution.

It should be noted that Examples 46 to 50 differ from Example 1 only in the average particle diameter of alumina and in alumina content.

EXAMPLE 47

A sealed non-aqueous electrolyte cell according to Example 47 was prepared in the same process as that of Example 46 except that the alumina used in Example 47 had an average particle diameter of 0.5 μm.

EXAMPLE 48

A sealed non-aqueous electrolyte cell according to Example 48 was prepared in the same process as that of Example 46 except that the alumina used in Example 48 had an average particle diameter of 2 μm.

EXAMPLE 49

A sealed non-aqueous electrolyte cell according to Example 49 was prepared in the same process as that of Example 46 except that the alumina used in Example 49 had an average particle diameter of 5 μm.

EXAMPLE 50

A sealed non-aqueous electrolyte cell according to Example 50 was prepared in the same process as that of Example 46 except that the alumina used in Example 50 had an average particle diameter of 10 μm.

EXAMPLE 51

1 mol (1M) of $LiPF_6$ was dissolved in a solution prepared by mixing ethylene carbonate (EC) and diethyl carbonate (DEC) in the ratio of 3:7, to produce an electrolytic solution. Then, alumina having an average particle diameter of 0.005 μm was added to the electrolytic solution thereby preparing an alumina-containing electrolytic solution having an alumina content of 20 wt %. A sealed non-aqueous electrolyte cell according to Example 51 was prepared in the same process as that of Example 1 except that the above alumina-containing electrolytic solution was used as an electrolytic solution.

It should be noted that Examples 51 to 55 differ from one another only in the average particle diameter of alumina.

EXAMPLE 52

A sealed non-aqueous electrolyte cell according to Example 52 was prepared in the same process as that of Example 51 except that the alumina used in Example 52 had an average particle diameter of 0.5 μm.

EXAMPLE 53

A sealed non-aqueous electrolyte cell according to Example 53 was prepared in the same process as that of Example 51 except that the alumina used in Example 53 had an average particle diameter of 2 μm.

EXAMPLE 54

A sealed non-aqueous electrolyte cell according to Example 54 was prepared in the same process as that of Example 51 except that the alumina used in Example 54 had an average particle diameter of 5 μm.

EXAMPLE 55

A sealed non-aqueous electrolyte cell according to Example 55 was prepared in the same process as that of Example 51 except that the alumina used in Example 55 had an average particle diameter of 10 μm.

EXAMPLE 56

1 mol (1M) of $LiPF_6$ was dissolved in a solution prepared by mixing ethylene carbonate (EC) and diethyl carbonate (DEC) in the ratio of 3:7, to produce an electrolytic solution. Then, alumina having an average particle diameter of 5 μm was added to the electrolytic solution thereby preparing an alumina-containing electrolytic solution having an alumina content of 0.1 wt %. A sealed non-aqueous electrolyte cell according to Example 56 was prepared in the same process as that of Example 1 except that the above alumina-containing electrolytic solution was used as an electrolytic solution.

It should be noted that Examples 56 to 58 differ from one another only in alumina content.

EXAMPLE 57

A sealed non-aqueous electrolyte cell according to Example 57 was prepared in the same process as that of Example 56 except that the alumina-containing electrolytic solution used in Example 57 contained 1 wt % alumina.

EXAMPLE 58

A sealed non-aqueous electrolyte cell according to Example 58 was prepared in the same process as that of Example 56 except that the alumna-containing electrolytic solution used in Example 58 contained 10 wt % alumina.

EXAMPLE 59

An electrolytic solution prepared by dissolving 1 mol (1M) of $LiPF_6$ in the EC/DEC solution (3/7) was mixed with polyethylene glycol diacrylate in the weight ratio of 1:4 and this mixture was further mixed with 1,000 ppm of 2, 4, 6-trimethyl benzoyl diphenylphosphine oxide which served as a photo polymerization initiator, whereby a prepolymer composition 3 was prepared.

Then, alumina (average particle diameter=0.005 μm) was added to the prepolymer composition 3 to produce an alumina-containing prepolymer composition having an alumina content of 0.05 wt %. This prepolymer composition was then impregnated into a polyethylene porous body similar to that used in Example 1. After the impregnation, the product was placed between glass sheets and exposed to light illumination thereby to prepare an alumina-containing solid polymer electrolyte film having a thickness of about 25 μm.

This polyethylene porous body impregnated with the alumina-containing solid polymer electrolyte was used as the separator 5 and the above electrolytic solution containing 1 mol of $LiPF_6$ dissolved in the EC/DEC (3/7) solution was introduced in the cell as the electrolytic solution for the electrodes. Except this procedure, the same process as that of Example 1 was taken to prepare a sealed non-aqueous electrolyte cell according to Example 59.

Note that Example 59 differs from Example 16 only in the composition of the electrolytic solution and in the particle diameter and content of alumina. Examples 59 to 63 have the same alumina content of 0.05 wt % but are varied in the average particle diameter of alumina.

EXAMPLE 60

A sealed non-aqueous electrolyte cell according to Example 60 was prepared in the same process as that of Example 59 except that the alumina used in Example 60 had an average particle diameter of 0.5 µm.

EXAMPLE 61

A sealed non-aqueous electrolyte cell according to Example 61 was prepared in the same process as that of Example 59 except that the alumina used in Example 61 had an average particle diameter of 2 µm.

EXAMPLE 62

A sealed non-aqueous electrolyte cell according to Example 62 was prepared in the same process as that of Example 59 except that the alumina used in Example 62 had an average particle diameter of 5µm.

EXAMPLE 63

A sealed non-aqueous electrolyte cell according to Example 63 was prepared in the same process as that of Example 59 except that the alumina used in Example 63 had an average particle diameter of 10 µm.

EXAMPLE 64

Alumina having an average particle diameter of 0.005 µm was added to the prepolymer composition 3 of Example 59 thereby preparing an alumina-containing prepolymer composition having an alumina content of 20 wt %. Then, a sealed non-aqueous electrolyte cell according to Example 64 was prepared in the same process as that of Example 59 except that the above composition was used in place of the alumina-containing prepolymer composition of Example 59.

It should be noted that Examples 64 to 68 have the same alumina content of 20 wt % but differ from one another only in the average particle diameter of alumina.

EXAMPLE 65

A sealed non-aqueous electrolyte cell according to Example 65 was prepared in the same process as that of Example 64 except that the alumina used in Example 65 had an average particle diameter of 0.5µm.

EXAMPLE 66

A sealed non-aqueous electrolyte cell according to Example 66 was prepared in the same process as that of Example 64 except that the alumina used in Example 66 had an average particle diameter of 2 µm.

EXAMPLE 67

A sealed non-aqueous electrolyte cell according to Example 67 was prepared in the same process as that of Example 64 except that the alumina used in Example 67 had an average particle diameter of 5 µm.

EXAMPLE 68

A sealed non-aqueous electrolyte cell according to Example 68 was prepared in the same process as that of Example 64 except that the alumina used in Example 68 had an average particle diameter of 10 µm.

EXAMPLE 69

Alumina having an average particle diameter of 5 µm was added to the prepolymer composition 3 of Example 59 thereby preparing an alumina-containing prepolymer composition having an alumina content of 0.1 wt %. Then, a sealed non-aqueous electrolyte cell according to Example 69 was prepared in the same process as that of Example 59 except that the above composition was used in place of the alumina-containing prepolymer composition of Example 59.

It should be noted that Examples 69 to 71 have the same alumina average particle diameter of 5 µm but differ from one another only in alumina content.

EXAMPLE 70

A sealed non-aqueous electrolyte cell according to Example 70 was prepared in the same process as that of Example 69 except that the alumina content of Example 70 was 1 wt %.

EXAMPLE 71

A sealed non-aqueous electrolyte cell according to Example 71 was prepared in the same process as that of Example 69 except that the alumina content of Example 71 was 10 wt %.

EXAMPLE 72

Alumina having an average particle diameter of 0.005 µm was added to the prepolymer composition 2 of Example 17 thereby preparing an alumina-containing prepolymer composition having an alumina content of 0.05 wt %. Then, a sealed non-aqueous electrolyte cell according to Example 72 was prepared in the same process as that of Example 17 (thermal polymerization was utilized) except that the above prepolymer composition was used in place of the alumina-containing prepolymer composition of Example 17.

It should be noted that Examples 72 to 76 have the same alumina content of 0.05 wt % but differ from one another only in the average particle diameter of alumina.

EXAMPLE 73

A sealed non-aqueous electrolyte cell according to Example 73 was prepared in the same process as that of Example 72 except that the average particle diameter of the alumina used in Example 73 was 0.5 µm.

EXAMPLE 74

A sealed non-aqueous electrolyte cell according to Example 74 was prepared in the same process as that of Example 72 except that the average particle diameter of the alumina used in Example 74 was 2 µm.

EXAMPLE 75

A sealed non-aqueous electrolyte cell according to Example 75 was prepared in the same process as that of Example 72 except that the average particle diameter of the alumina used in Example 75 was 5 µm.

EXAMPLE 76

A sealed non-aqueous electrolyte cell according to Example 76 was prepared in the same process as that of Example 72 except that the average particle diameter of the alumina used in Example 76 was 10 µm.

EXAMPLE 77

Alumina having an average particle diameter of 0.005 µm was added to the prepolymer composition 2 of Example 17 thereby preparing an alumina-containing prepolymer composition having an alumina content of 20 wt %. Then, a sealed non-aqueous electrolyte cell according to Example 77 was prepared in the same process as that of Example 17 (thermal polymerization was utilized) except that the above prepolymer composition was used in place of the alumina-containing prepolymer composition of Example 17.

It should be noted that Examples 77 to 81 have the same alumina content of 20 wt % but differ from one another only in the average particle diameter of alumina.

EXAMPLE 78

A sealed non-aqueous electrolyte cell according to Example 78 was prepared in the same process as that of Example 77 except that the average particle diameter of the alumina used in Example 78 was 0.5 $\mu$m.

EXAMPLE 79

A sealed non-aqueous electrolyte cell according to Example 79 was prepared in the same process as that of Example 77 except that the average particle diameter of the alumina used in Example 79 was 2 $\mu$m.

EXAMPLE 80

A sealed non-aqueous electrolyte cell according to Example 80 was prepared in the same process as that of Example 77 except that the average particle diameter of the alumina used in Example 80 was 5 $\mu$m.

EXAMPLE 81

A sealed non-aqueous electrolyte cell according to Example 81 was prepared in the same process as that of Example 77 except that the average particle diameter of the alumina used in Example 81 was 10 $\mu$m.

EXAMPLE 82

Alumina having an average particle diameter of 5 $\mu$m was added to the prepolymer composition 2 of Example 17 thereby preparing an alumina-containing prepolymer composition having an alumina content of 0.1 wt %. Then, a sealed non-aqueous electrolyte cell according to Example 82 was prepared in the same process as that of Example 17 (thermal polymerization was utilized) except that the above prepolymer composition was used in place of the alumina-containing prepolymer composition of Example 17.

It should be noted that Examples 82 to 84 have the same alumina average particle diameter of 5 $\mu$m but differ from one another only in alumina content.

EXAMPLE 83

A sealed non-aqueous electrolyte cell according to Example 83 was prepared in the same process as that of Example 82 except that the alumina-containing electrolytic solution used in Example 83 contained 1 wt % alumina.

EXAMPLE 84

A sealed non-aqueous electrolyte cell according to Example 84 was prepared in the same process as that of Example 82 except that the alumina-containing electrolytic solution used in Example 84 contained 10 wt % alumina.

EXAMPLE 85

A sealed non-aqueous electrolyte cell according to Example 85 was prepared in the same process as that of Example 1 except that alumina was replaced with silica (silicon dioxide) in Example 85.

EXAMPLE 86

A sealed non-aqueous electrolyte cell according to Example 86 was prepared in the same process as that of Example 1 except that alumina was replaced with zeolite in Example 86.

COMPARATIVE EXAMPLE 1

A sealed non-aqueous electrolyte cell according to Comparative Example 1 was prepared in the same process as that of Example 1 except that alumina was not added.

COMPARATIVE EXAMPLE 2

A sealed non-aqueous electrolyte cell according to Comparative Example 2 was prepared in the same process as that of Example 2 except that alumina was not added.

COMPARATIVE EXAMPLE 3

A sealed non-aqueous electrolyte cell according to Comparative Example 3 was prepared in the same process as that of Example 3 except that alumina was not added.

COMPARATIVE EXAMPLE 4

A sealed non-aqueous electrolyte cell according to Comparative Example 4 was prepared in the same process as that of Example 16 except that alumina was not added.

COMPARATIVE EXAMPLE 5

A sealed non-aqueous electrolyte cell according to Comparative Example 5 was prepared in the same process as that of Example 17 except that alumina was not added.

Tests were conducted on the cells prepared according to the above examples and comparative examples to check possible leakage and the discharge rate characteristic (1C/0.2C capacity ratio) and cycling capability of each cell. The method of each test and test results will be explained below.

(1) Leakage Test 20 cells were prepared for each example. These cells were allowed to stand for 20 days in the atmosphere where relative humidity was 90% and temperature was 60° C. After that, the sample cells were visually checked for possible leakage. The test results are shown together with other conditions in TABLES 1 to 7.

The Relationship Between Alumina Content and Leakage

No leakage was observed in the cells prepared according to Examples 49, 56, 57, 7 and 58 which had the same particle diameter of alumina (5 $\mu$m) and alumina contents of 0.05 wt %, 0.1 wt %, 1 wt %, 5 wt % and 10 wt %, respectively.

Regarding Examples 9 to 12, 1, and 13 to 15, which had the same average particle diameter of alumina (0.05 $\mu$m) and alumina contents of 0.01 wt %, 0.05 wt %, 0.1 wt %, 1 wt %, 5 wt %, 10 wt %, 20 wt %, and 30 wt %, respectively, leakage occurred (incidence: 3/20) in the cells having an alumina content of 0.01 wt % Example 9), but no leakage was admitted in the cells having alumina contents of 0.05 wt % or more.

Regarding Comparative Example 1 which was identical with the above cells with the exception that no alumina was added, leakage was observed in eight cells out of 20 cells (i.e., incidence: 8/20).

It is understood from these results that alumina is preferably contained in amounts of 0.05 wt % or more.

The Relationship Between the Particle Diameter of Alumina and Leakage

Regarding Examples 46, 10, and 47 to 50 which had the same alumina content (0.05 wt %) and alumina particle diameters of 0.005 μm, 0.05 μm, 0.5 μm, 2 μm, 5 μm and 10 μm, respectively, leakage occurred incidence: 8/20) in the cells having an alumina particle diameter of 10 μm Example 50) but no leakage was admitted in the cells having alumina particle diameters of 5μm or less.

Regarding Examples 4, 1, and 5 to 8 which had the same alumina content (5 wt %) and alumina 1314 particle diameters of 0.005 μm, 0.05 μm, 0.5 μm, 2 μm, 5 μm and 10 μm, respectively, leakage occurred (incidence: 3/20) in the cells having an alumina particle diameter of 10 μm Example 8), but no leakage was observed in the cells having alumina particle diameters of 5 μm or less.

Regarding Examples 51 to 55 which have the same alumina content (20 wt %) and alumina particle diameters of 0.005 μm, 0.5 μm, 2 μm, 5 μm and 10 μm, respectively, no leakage was observed in all the cells.

It is understood from the above results that the particle diameter of alumina is preferably 5 μm or less, and that even if the particle diameter of alumina exceeds 5 μm, no leakage occurs on condition that alumina content is 20 wt %.

Cases where other inorganic oxide fine powders than alumina were added

The leakage test was conducted in the same manner as described above on the cells of Examples 85 and 86 which were identical with Example 1 with the exception that silica (silicon dioxide) or zeolite was added in place of alumina.

As seen from TABLE 6, no leakage was observed in Examples 85 and 86 like Example 1.

(2) 1C/0.2C Cell Capacity Ratio Test

A cell capacity ratio (1C/0.2C) test was conducted on the cells constructed according to each example in the following manner.

Each cell was charged with 400 mA (1C) until the voltage of the cell reached 4.1V, and electric charge was continued with charging current gradually reduced to 20 mA, while voltage being kept at 4.1V. Then, the cell was allowed to discharge with a current of 400 mA (1C) until the voltage of the cell reached 2.75V. During this discharge, the discharge capacity (1C discharge capacity) of the cell was measured. Subsequently, each cell was charged with 400 mA (1C) until the voltage of the cell reached 4.1V and electric charge was continued with charging current gradually reduced to 20 mA, while voltage being kept at 4.1V. Thereafter, the cell was allowed to discharge with a current of 80 mA (0.2C) until the voltage of the cell reached 2.75V, during which the discharge capacity (0.2C discharge capacity) of the cell was measured. Then, the ratio of the 1C discharge capacity to the 0.2C discharge capacity (i.e., the 1C/0.2C capacity ratio) was obtained.

(Test results)

Figure 6:
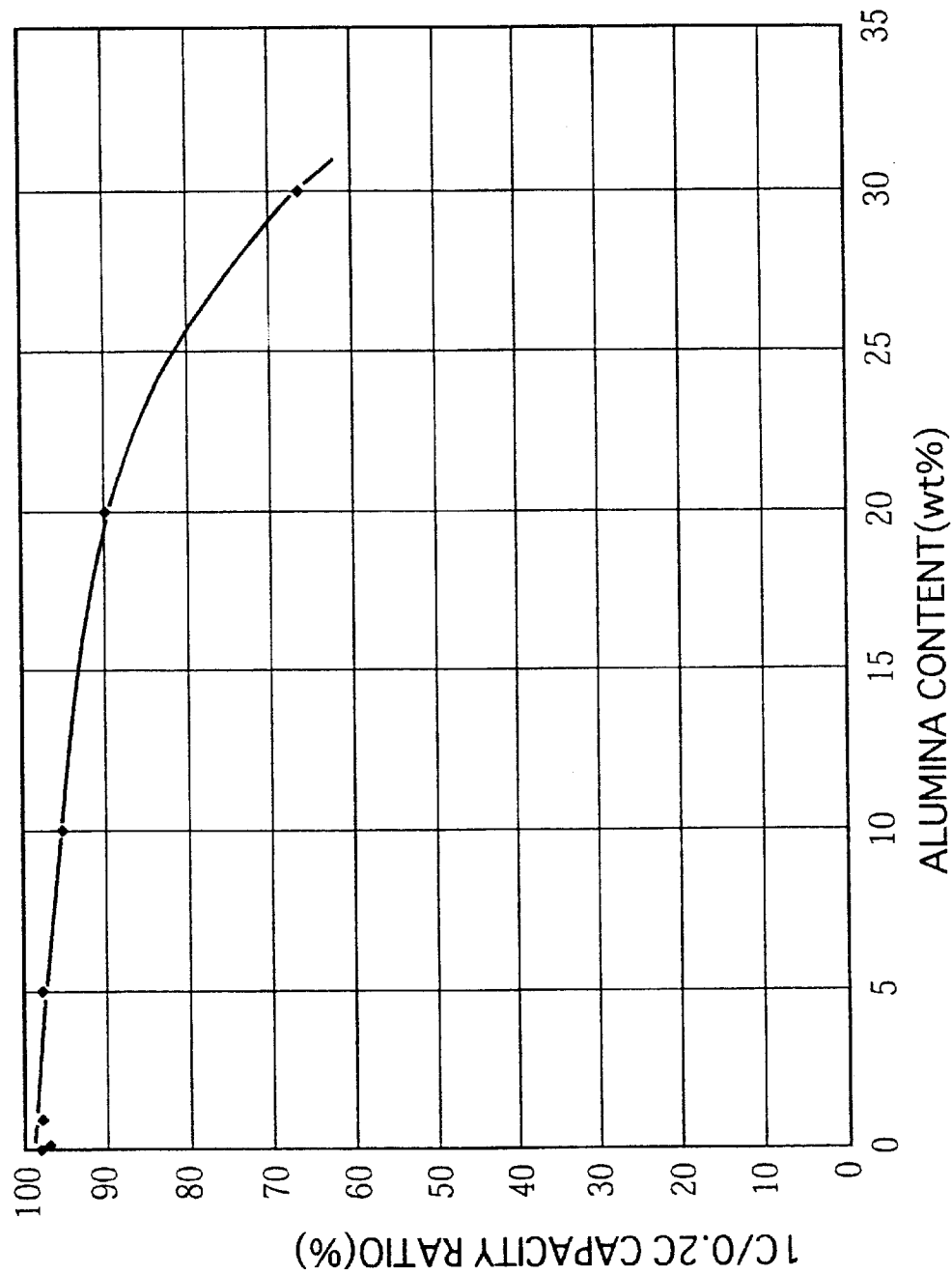
FIG. 6 is a graph showing the relationship between 1C/0.2C capacity ratio and the alumina content of an alumina-containing electrolyte comprising a 1M-$LiPF_6$.EC/DEC(3/7) solution.
Figure 7:
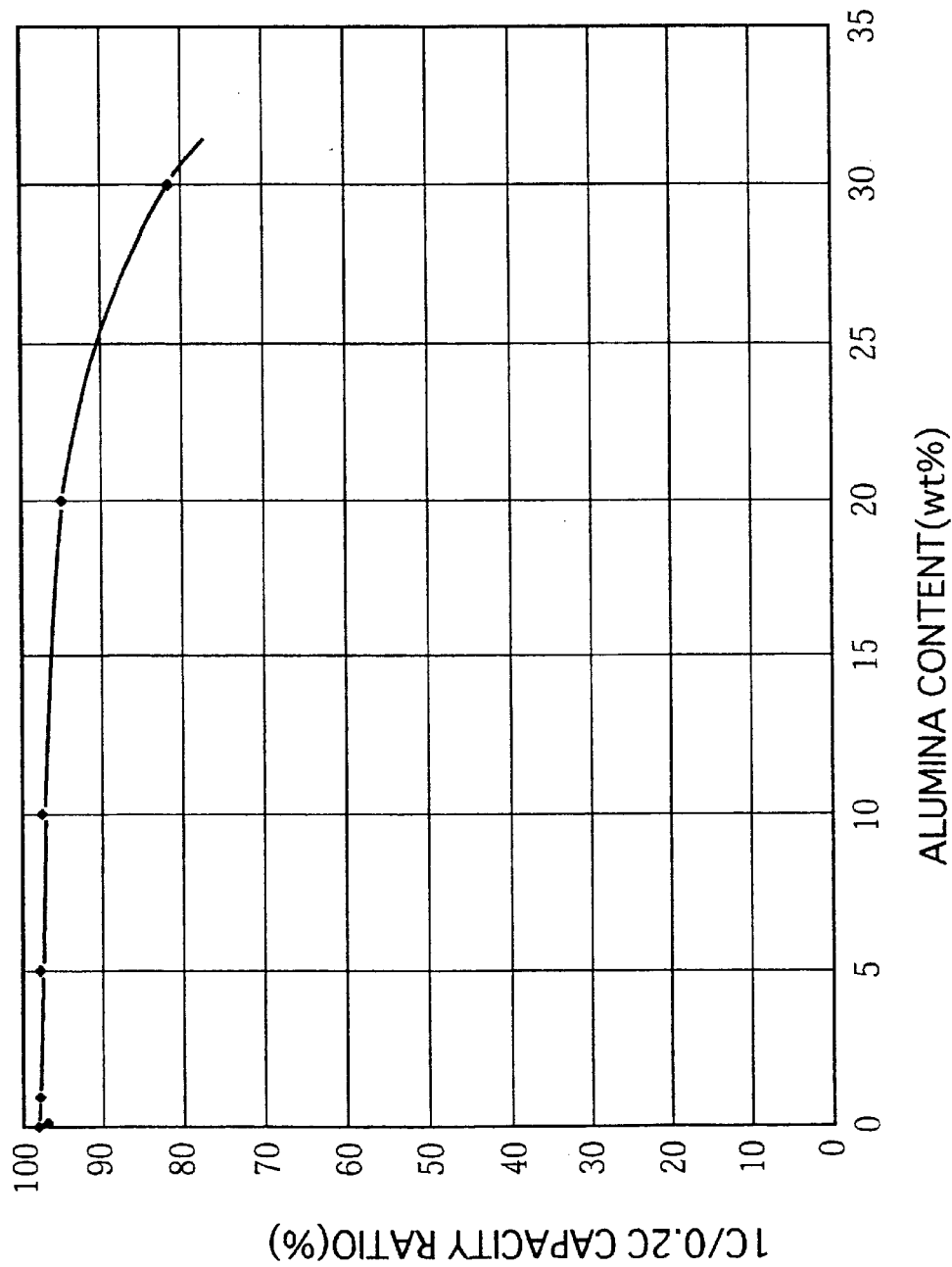
FIG. 7 is a graph showing the relationship between 1C/0.2C capacity ratio and the alumina content of a solid polymer electrolyte formed by photo polymerization of PEGdAC.1M-$LiPF_6$.EC/DEC(3/7).
Figure 8:
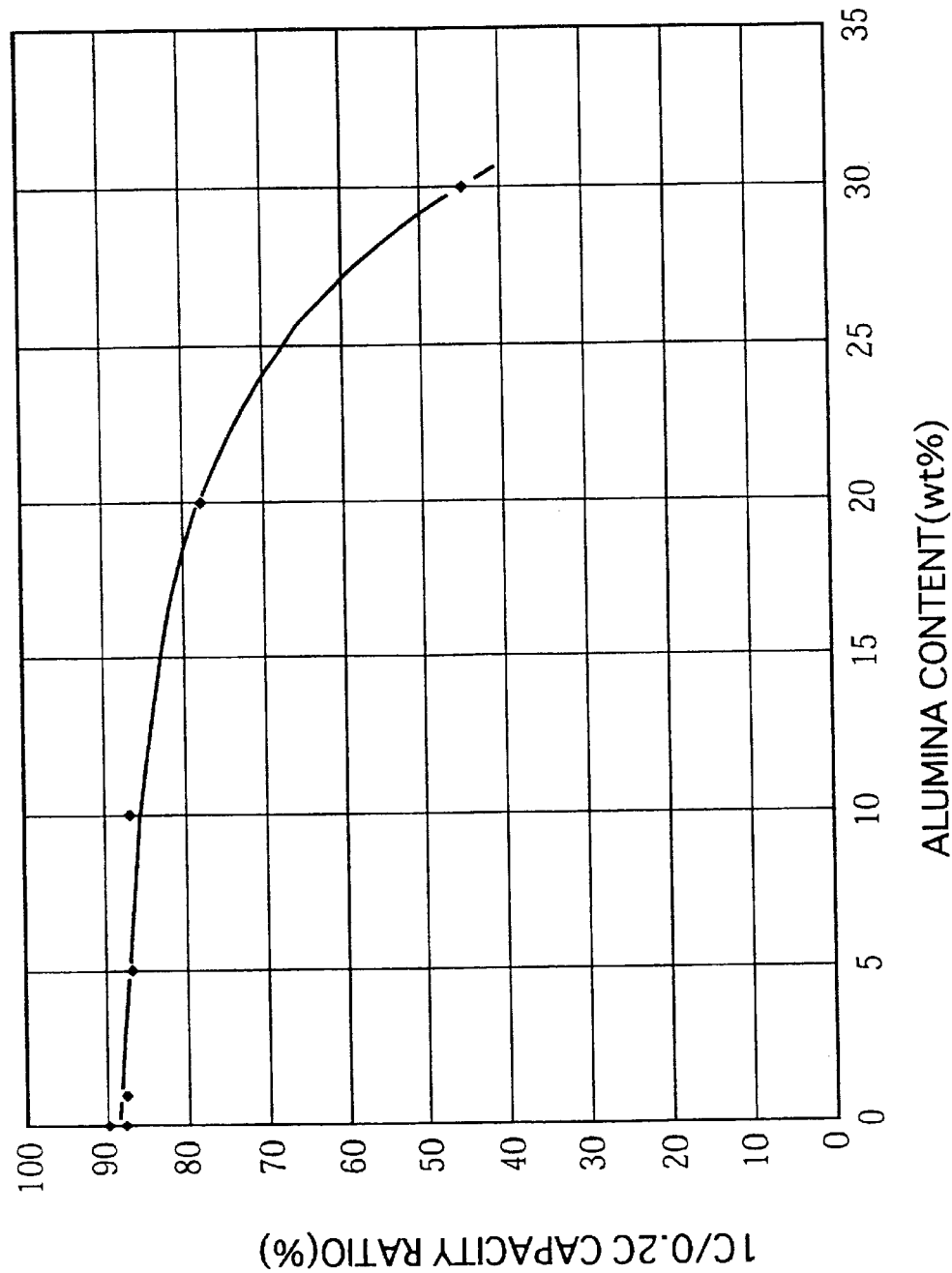
FIG. 8 is a graph showing the relationship between 1C/0.2C capacity ratio and the alumina content of a solid polymer electrolyte formed by thermal polymerization of PEGDAC.1M-$LiPF_6$.EC/DEC(3/7).

The cell capacity ratios (1C/0.2C) of the cells prepared according to Examples 1 and 9 to 15 (1M LiPF$_6$.EC/DEC= 3/7) are shown in relation with their alumina contents in the graph of FIG. 6. FIG. 7 demonstrates the relationship between the cell capacity ratios (1C/0.2C) and alumina contents of the cells prepared according to Examples 16 and 25 to 31 (PEG dAC 1M LiPF$_6$. EC/DEC=3/7, photo polymerization). FIG. 8 demonstrates the relationship between the cell capacity ratios (1C/0.2C) and alumina contents of the cells prepared according to Examples 17 and 39 to 45 (PEG dAC 1M LiPF$_6$.EC/DEC=3/7, thermal polymerization).

In all of the cells shown in FIGS. 6 to 8, the cell capacity ratio (1C/0.2C) decreases as the alumina content of the alumina-containing electrolytic solution or alumina-containing prepolymer composition increases. The cell capacity ratio decreases to a significant extent especially where alumina content exceeds 20%. It is apparent from this fact that when taking the 1C/0.2C cell capacity ratio into account, alumina is preferably contained in amounts of 20 wt % or less.

In consideration of the results of the cell capacity ratio test together with the results of the leakage test, the alumina content (i.e., inorganic oxide fine powder content) of the alumina-containing electrolytic solution or alumina-containing prepolymer composition is preferably in the range of from 0.05 wt % to 20 wt %.

(3) Charge/Discharge Cycling Test

This test was conducted in the following manner to check the relationship between the effects of the addition of alumina and the types of electrolyte salts, in relation with the cycling capability of each cell.

Each cell was charged with 400 mA (C) until the voltage of the cell reached 4.1V, and electric charge was continued with charging current gradually reduced to 20 mA, while the same voltage being kept. Then, the cell was allowed to discharge with a current of 400 mA (1C) until the voltage of the cell reached 2.75V. Such a charge/discharge cycle was repeated at room temperature (=about 25° C.), during which the first discharge capacity W1 and the x-th discharge capacity Wx were measured. Then, the cell capacity ratio (%) of the cell was obtained from Equation 1. The results are plotted in FIG. 9.

Cell capacity ratio (%)=[Wx/W1]×100          Equation (1)

Figure 9:
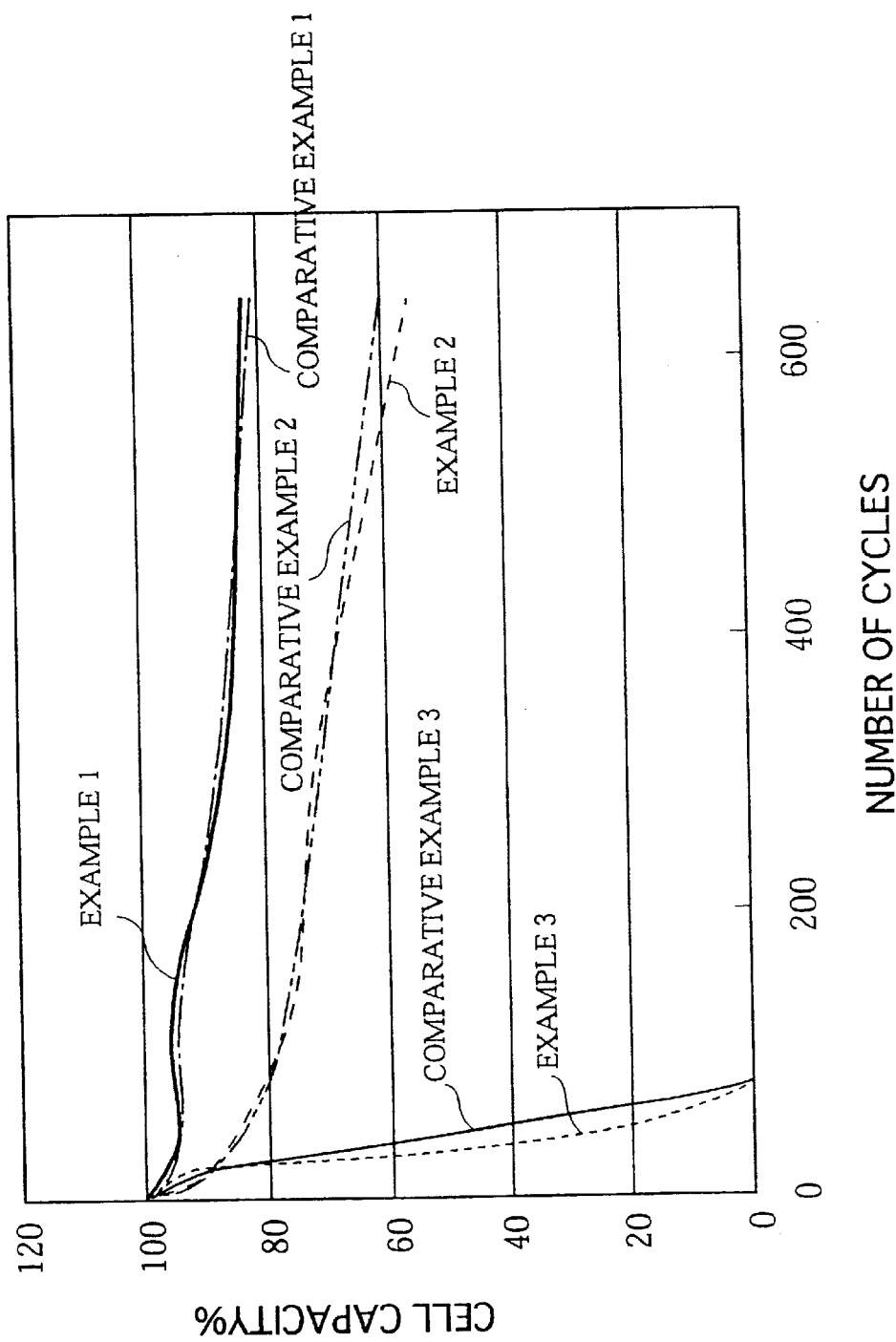
FIG. 9 is a graph showing the cycling capabilities of Examples 1, 2, 3 and Comparative Examples 1, 2, 3.

As seen from FIG. 9, the cycling capabilities of the examples increase in the following order: Example 1=Comparative Example 1>Example 2=Comparative Example 2>>Comparative Example 3=Example 3. When this relationship is represented on the basis of the types of electrolytes, it is described by: [LiPF$_6$.EC/DEC=3/7]> [LiBF$_4$.EC/DEC=3/7]>>[Li(CF$_3$SO$_2$)$_2$N.EC/DEC=3/7]. Accordingly, it is understood that the best cycling capability can be achieved where LiPF$_6$ is used as an electrolyte salt.

The above results may be interpreted as follows: A non-aqueous electrolyte cell containing LiPF$_6$ as an electrolyte salt has high cycling capability and can fully exert its high cycling capability if the inorganic oxide fine powder is added to the cell thereby preventing the expiration of its service life due to a decrease in the degree of sealing. Accordingly, a long life can be ensured by the application of the invention.

As has been described above, the invention proposes addition of an inorganic oxide fine powder which is not an electrode active material to a sealed non-aqueous electrolyte cell having a laminate casing and this inorganic oxide fine powder adsorbs components or reactive components which cause deterioration in adhesive strength at the sealing parts of the cell. Therefore, the cell of the invention can keep appropriate sealing for a long time, compared to the prior arts cells containing no inorganic oxide fine powder. Accordingly, it is understood that the invention has the effect of significantly improving the service life of a cell.

TABLE 1

| | ALUMINA | | ELECTROLYTIC SOLUTION OR PREPOLYMER COMPOSITION | INCIDENCE OF LEAKAGE PER 20 CELLS |
|---|---|---|---|---|
| | CONTENT wt % | PARTICLE DIAMETER μm | | |
| EXAMPLE 1 | 5 | 0.05 | a | 0 |
| EXAMPLE 2 | 5 | 0.05 | b | 0 |
| EXAMPLE 3 | 5 | 0.05 | c | 0 |
| EXAMPLE 4 | 5 | 0.005 | a | 0 |
| EXAMPLE 5 | 5 | 0.5 | a | 0 |
| EXAMPLE 6 | 5 | 2 | a | 0 |
| EXAMPLE 7 | 5 | 5 | a | 0 |
| EXAMPLE 8 | 5 | 10 | a | 3 |
| EXAMPLE 9 | 0.01 | 0.05 | a | 3 |
| EXAMPLE 10 | 0.05 | 0.05 | a | 0 |
| EXAMPLE 11 | 0.1 | 0.05 | a | 0 |
| EXAMPLE 12 | 1 | 0.05 | a | 0 |
| EXAMPLE 13 | 10 | 0.05 | a | 0 |
| EXAMPLE 14 | 20 | 0.05 | a | 0 |
| EXAMPLE 15 | 30 | 0.05 | a | 0 | a; 1M LiPF$_6$.EC/DEC = 3/7,
b; 1M LiBF$_4$.EC/DEC = 3/7,
c; 1M Li(CF$_3$SO$_2$)$_2$N.EC/DEC = 3/7,

TABLE 2

| | ALUMINA | | ELECTROLYTIC SOLUTION OR PREPOLYMER COMPOSITION | INCIDENCE OF LEAKAGE PER 20 CELLS |
|---|---|---|---|---|
| | CONTENT wt % | PARTICLE DIAMETER μm | | |
| EXAMPLE 16 | 5 | 0.05 | d | 0 |
| EXAMPLE 17 | 5 | 0.05 | e | 0 |
| EXAMPLE 18 | 5 | 0.05 | f | 0 |
| EXAMPLE 19 | 5 | 0.05 | g | 0 |
| EXAMPLE 20 | 5 | 0.005 | d | 0 |
| EXAMPLE 21 | 5 | 0.5 | d | 0 |
| EXAMPLE 22 | 5 | 2 | d | 0 |
| EXAMPLE 23 | 5 | 5 | d | 0 |
| EXAMPLE 24 | 5 | 10 | d | 3 |
| EXAMPLE 25 | 0.01 | 0.05 | d | 3 |
| EXAMPLE 26 | 0.05 | 0.05 | d | 0 |
| EXAMPLE 27 | 0.1 | 0.05 | d | 0 |
| EXAMPLE 28 | 1 | 0.05 | d | 0 |
| EXAMPLE 29 | 10 | 0.05 | d | 0 |
| EXAMPLE 30 | 20 | 0.05 | d | 0 |
| EXAMPLE 31 | 30 | 0.05 | d | 0 | d; PEG dAC.1M LiPF$_6$.EC/DEC = 3/7 (PHOTO),
e; PEG dAC.1M LiPF$_6$.EC/DEC = 3/7 (THERMAL),
f; PEG dAC.1M LiBF$_4$.EC/DEC = 3/7 (PHOTO),
g; 1M Li(CF$_3$SO$_2$)$_2$N.EC/DEC = 3/7,

TABLE 3

| | ALUMINA | | ELECTROLYTIC SOLUTION OR PREPOLYMER COMPOSITION | INCIDENCE OF LEAKAGE PER 20 CELLS |
|---|---|---|---|---|
| | CONTENT wt % | PARTICLE DIAMETER μm | | |
| EXAMPLE 32 | 5 | 0.05 | h | 0 |
| EXAMPLE 33 | 5 | 0.05 | j | 0 |
| EXAMPLE 34 | 5 | 0.005 | e | 0 |
| EXAMPLE 35 | 5 | 0.5 | e | 0 |
| EXAMPLE 36 | 5 | 2 | e | 0 |
| EXAMPLE 37 | 5 | 5 | e | 0 |

TABLE 3-continued

| | ALUMINA | | ELECTROLYTIC SOLUTION OR PREPOLYMER COMPOSITION | INCIDENCE OF LEAKAGE PER 20 CELLS |
|---|---|---|---|---|
| | CONTENT wt % | PARTICLE DIAMETER μm | | |
| EXAMPLE 38 | 5 | 10 | e | 1 |
| EXAMPLE 39 | 0.01 | 0.05 | e | 2 |
| EXAMPLE 40 | 0.05 | 0.05 | e | 0 |
| EXAMPLE 41 | 0.1 | 0.05 | e | 0 |
| EXAMPLE 42 | 1 | 0.05 | e | 0 |
| EXAMPLE 43 | 10 | 0.05 | e | 0 |
| EXAMPLE 44 | 20 | 0.05 | e | 0 |
| EXAMPLE 45 | 30 | 0.05 | e | 0 |
| EXAMPLE 46 | 0.05 | 0.005 | a | 0 |
| EXAMPLE 47 | 0.05 | 0.5 | a | 0 |
| EXAMPLE 48 | 0.05 | 2 | a | 0 |
| EXAMPLE 49 | 0.05 | 5 | a | 0 |
| EXAMPLE 50 | 0.05 | 10 | a | 8 | a; 1M LiPF$_6$.EC/DEC = 3/7,
e; PEG dAC.1M.LiPF$_6$.EC/DEC = 3/7 (THERMAL),
h; 1M LiBF$_4$.EC/DEC = 3/7,
i; 1M Li(CF$_3$SO$_2$)$_2$N.EC/DEC = 3/7,

TABLE 4

| | ALUMINA | | ELECTROLYTIC SOLUTION OR PREPOLYMER COMPOSITION | INCIDENCE OF LEAKAGE PER 20 CELLS |
|---|---|---|---|---|
| | CONTENT wt % | PARTICLE DIAMETER μm | | |
| EXAMPLE 51 | 20 | 0.005 | a | 0 |
| EXAMPLE 52 | 20 | 0.5 | a | 0 |
| EXAMPLE 53 | 20 | 2 | a | 0 |
| EXAMPLE 54 | 20 | 5 | a | 0 |
| EXAMPLE 55 | 20 | 10 | a | 0 |
| EXAMPLE 56 | 0.1 | 5 | a | 0 |
| EXAMPLE 57 | 1 | 5 | a | 0 |
| EXAMPLE 58 | 10 | 5 | a | 0 |
| EXAMPLE 59 | 0.05 | 0.005 | d | 0 |
| EXAMPLE 60 | 0.05 | 0.5 | d | 0 |
| EXAMPLE 61 | 0.05 | 2 | d | 0 |
| EXAMPLE 62 | 0.05 | 5 | d | 0 |
| EXAMPLE 63 | 0.05 | 10 | d | 4 |
| EXAMPLE 64 | 20 | 0.005 | d | 0 |
| EXAMPLE 65 | 20 | 0.5 | d | 0 |
| EXAMPLE 66 | 20 | 2 | d | 0 |
| EXAMPLE 67 | 20 | 5 | d | 0 |
| EXAMPLE 68 | 20 | 10 | d | 0 | a; 1M LIPF$_6$.EC/DEC = 3/7,
d; PEG dAC.1M LiPF$_6$.EC/DEC = 3/7 (PHOTO),

TABLE 5

| | ALUMINA | | ELECTROLYTIC SOLUTION OR PREPOLYMER COMPOSITION | INCIDENCE OF LEAKAGE PER 20 CELLS |
|---|---|---|---|---|
| | CONTENT wt % | PARTICLE DIAMETER μm | | |
| EXAMPLE 69 | 0.1 | 5 | d | 0 |
| EXAMPLE 70 | 1 | 5 | d | 0 |
| EXAMPLE 71 | 10 | 5 | d | 0 |
| EXAMPLE 72 | 0.05 | 0.005 | e | 0 |
| EXAMPLE 73 | 0.05 | 0.5 | e | 0 |
| EXAMPLE 74 | 0.05 | 2 | e | 0 |
| EXAMPLE 75 | 0.05 | 5 | e | 0 |

TABLE 5-continued

| | ALUMINA | | ELECTROLYTIC SOLUTION OR PREPOLYMER COMPOSITION | INCIDENCE OF LEAKAGE PER 20 CELLS |
|---|---|---|---|---|
| | CON-TENT wt % | PARTICLE DIAMETER μm | | |
| EXAMPLE 76 | 0.05 | 10 | e | 2 |
| EXAMPLE 77 | 20 | 0.005 | e | 0 |
| EXAMPLE 78 | 20 | 0.5 | e | 0 |
| EXAMPLE 79 | 20 | 2 | e | 0 |
| EXAMPLE 80 | 20 | 5 | e | 0 |
| EXAMPLE 81 | 20 | 10 | e | 0 |
| EXAMPLE 82 | 0.1 | 5 | e | 0 |
| EXAMPLE 83 | 1 | 5 | e | 0 |
| EXAMPLE 84 | 10 | 5 | e | 0 | d; PEG dAC.1M $LiPF_6$.EC/DEC = 3/7 (PHOTO),
e; PEG dAC.1M $LiPF_6$.EC/DEC = 3/7 (THERMAL),

TABLE 6

| | INORGANIC OXIDE FINE POWDER | | | ELECTROLYTIC SOLUTION | INCIDENCE OF LEAKAGE PER 20 CELLS |
|---|---|---|---|---|---|
| | TYPE | CONTENT wt % | PARTICLE DIAMETER μm | | |
| EXAMPLE 85 | SILICA | 5 | 0.05 | a | 0 |
| EXAMPLE 86 | ZEOLITE | 5 | 0.05 | a | 0 |

TABLE 7

| | ALUMINA | | ELECTROLYTIC SOLUTION OR PREPOLYMER COMPOSITION | INCIDENCE OF LEAKAGE PER 20 CELLS |
|---|---|---|---|---|
| | CONTENT wt % | PARTICLE DIAMETER μm | | |
| COMPARATIVE EXAMPLE 1 | 0 | — | a | 8 |
| COMPARATIVE EXAMPLE 2 | 0 | — | b | 5 |
| COMPARATIVE EXAMPLE 3 | 0 | — | c | 4 |
| COMPARATIVE EXAMPLE 4 | 0 | — | d | 8 |
| COMPARATIVE EXAMPLE 5 | 0 | — | e | 7 |

What is claimed is:

1. A sealed non-aqueous electrolyte cell comprising:
a casing that is made from a sheet of laminated material comprising a metal foil, a first polypropylene layer bonded on an outer surface of said metal foil through a dry laminate adhesive layer, and a second polypropylene layer disposed inside the casing bonded on an inner surface of said metal foil through a carboxylic acid-denatured polypropylene layer, and is sealed by a sealing part wherein opposed edges of the laminated material are bonded to each other to hermetically seal the cell; and
an inorganic oxide fine powder that is not an electrode active material and is accommodated within the casing together with electric energy generating elements.

2. A sealed non-aqueous electrolyte cell according to claim 1, wherein said metal foil is made from aluminum.

3. A sealed non-aqueous electrolyte cell according to 2, claim wherein said inorganic oxide fine powder is contained in an electrolyte.

4. A sealed non-aqueous electrolyte cell according to claim 3, wherein said inorganic oxide fine powder has an average particle diameter of 5 μm or less.

5. A sealed non-aqueous electrolyte cell according to claim 4, wherein said inorganic oxide fine powder is contained in amounts of 0.05 to 20% by weight of the electrolyte.

6. A sealed non-aqueous electrolyte cell according to claim 5, wherein said electrolyte is a solid polymer electrolyte.

7. A sealed non-aqueous electrolyte cell according to claim 6, wherein said electrolyte contains $LiPF_6$ as an electrolyte salt.

8. A sealed non-aqueous electrolyte cell according to claim 7, wherein said inorganic oxide fine powder comprises alumina, magnesia, or a complex oxide composed of alumina and magnesia.

9. A sealed non-aqueous electrolyte cell according to claim 1, wherein said inorganic oxide fine powder comprises alumina, magnesia, or a complex oxide composed of alumina and magnesia.

10. A sealed non-aqueous electrolyte cell according to claim 9, wherein said alumina, magnesia, or complex oxide composed of alumina and magnesia is contained in the electrolyte.

11. A sealed non-aqueous electrolyte cell according to claim 10, wherein said electrolyte contains $LiPF_6$ as an electrolyte salt.

12. A sealed non-aqueous electrolyte cell according to claim 11, wherein said alumina, magnesia, or complex oxide composed of alumina and magnesia has an average particle diameter of 5 μm or less.

13. A sealed non-aqueous electrolyte cell according to claim 12, wherein said alumina, magnesia, or complex oxide composed of alumina and magnesia is contained in amounts of 0.05 to 20% by weight of the electrolyte.

14. A sealed non-aqueous electrolyte cell according to claim 1, wherein said inorganic oxide fine powder is a material that absorbs or adsorbs moisture and/or hydrofluoric acid in the cell.

* * * * *